Sept. 12, 1933. W. G. HOELSCHER ET AL 1,926,996
CARRIAGE FEEDING MECHANISM FOR LATHES
Filed April 30, 1931 3 Sheets-Sheet 1
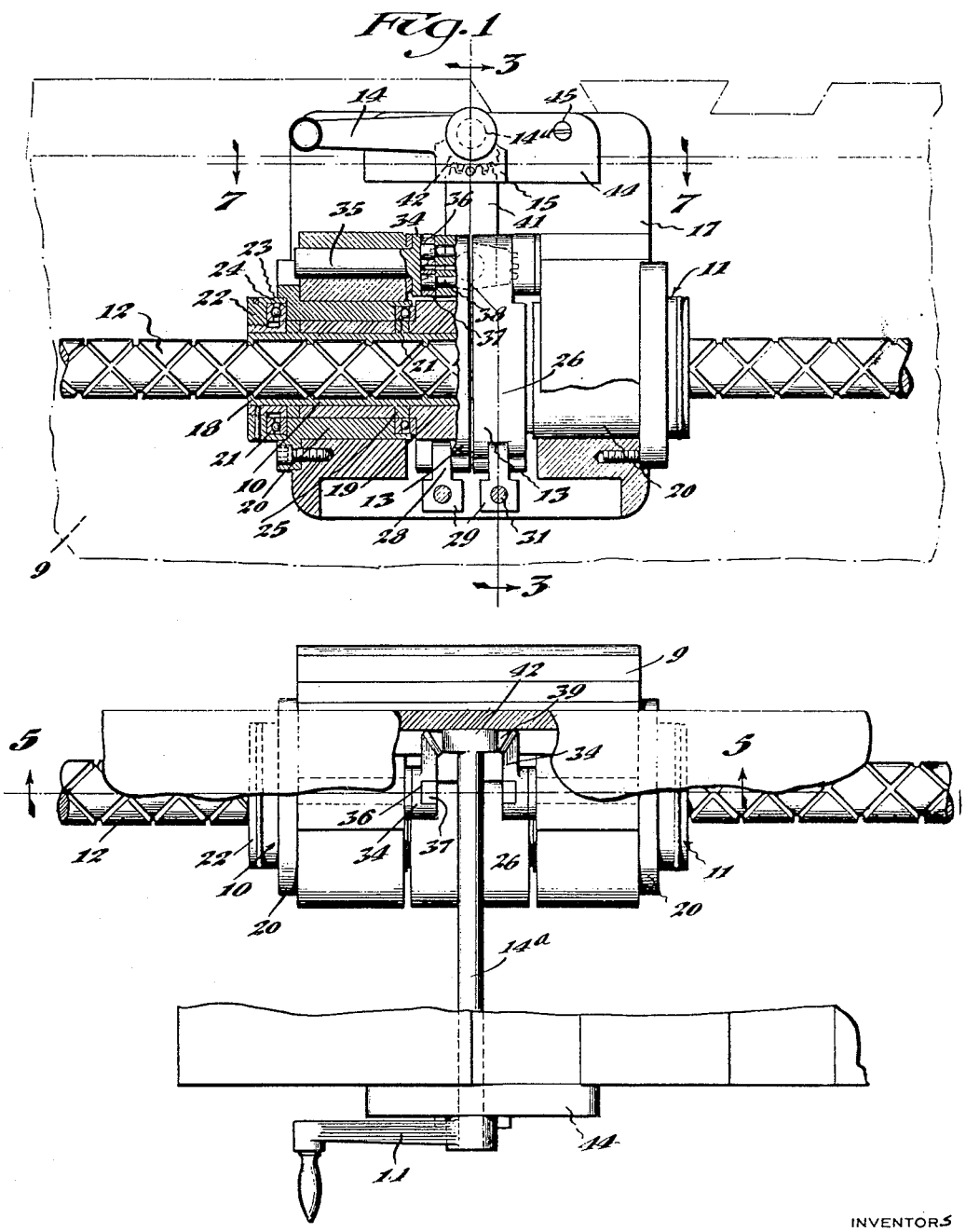

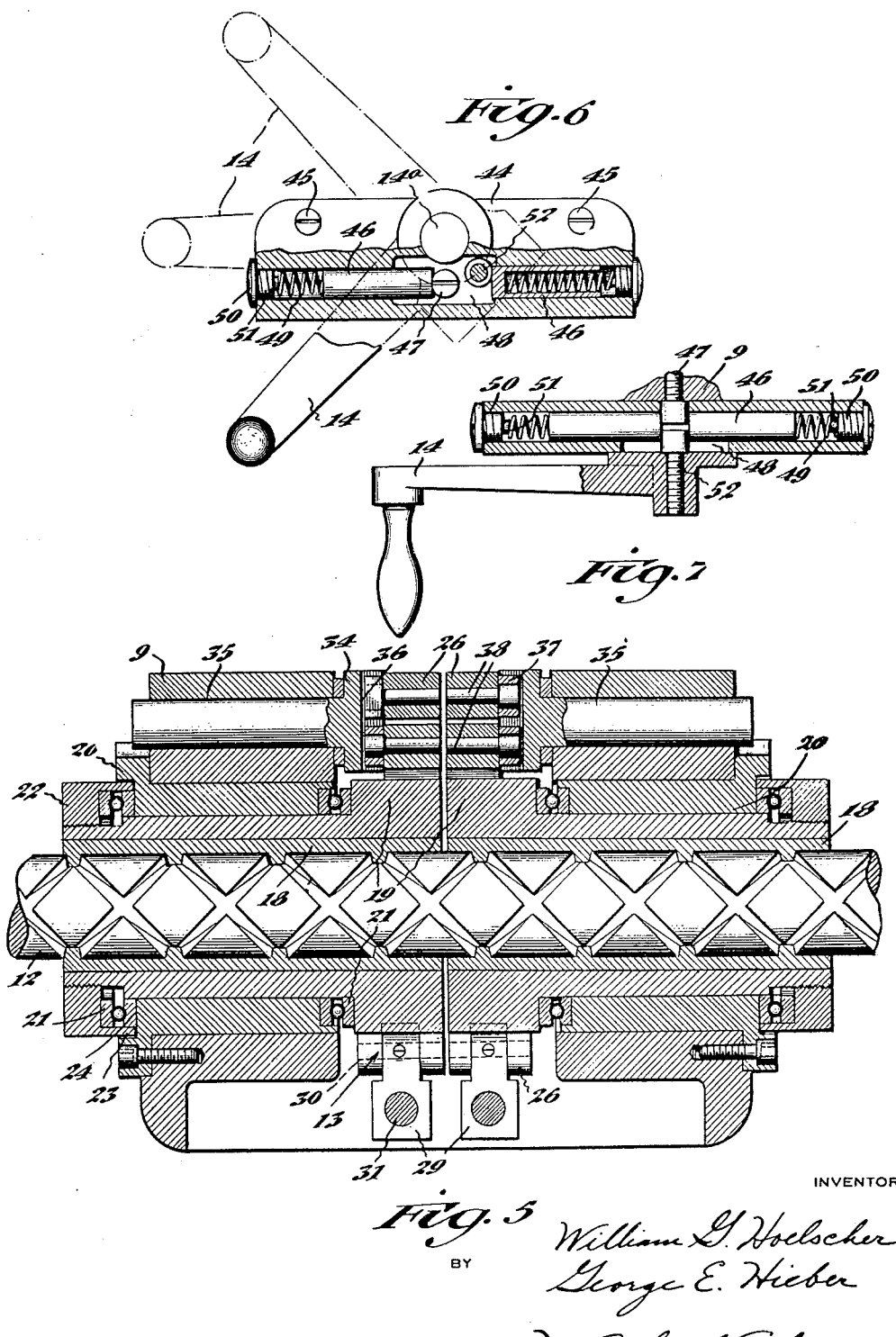

Patented Sept. 12, 1933

1,926,996

UNITED STATES PATENT OFFICE 1,926,996

CARRIAGE FEEDING MECHANISM FOR LATHES

William G. Hoelscher, Norwood, and George E. Hieber, Cincinnati, Ohio, assignors to The American Tool Works Company, Cincinnati, Ohio, a corporation of Ohio Application April 30, 1931. Serial No. 534,030

7 Claims. (Cl. 82—21)

This invention relates to power rapid traverse mechanisms for lathes for moving the carriage longitudinally along the ways of the lathe bed and particularly a machine employing a right and left hand threaded feed screw and two nuts respectively providing right and left hand threads. These nuts are alternately gripped and bound to the carriage as a fixed part thereof for the purpose of causing the rotative movement of the screw to transmit movement to the carriage in a direction governed by the particular nut held stationary at the time.

It is an object of this invention to provide means for gripping the respective nuts wherein a substantial leverage is provided for actuating the nut gripping means to impart extremely great pressure on the nuts, the leverage being moved by means of a manual control lever whereby the traversing mechanism includes features of extreme sensibility and efficiency for delicate control of the power transmission to the carriage.

It is a further object of this invention to provide improved means for gripping the traversing nuts, whereby the gripping forces are applied uniformly and the thrusts are directed to the center of the feed screw whereby there is no tendency to disalign the feed screw or to create unbalanced binding of the nuts in the carriage.

It is another object of this invention to provide a single lever control for either direction of movement of the carriage and to extend this control to a position conveniently accessible to the operator.

It is another object of this invention to provide a control for alternately gripping the nuts, whereby the respective gripping means are released by positive manual force eliminating dragging of the gripping means on the nuts, and the nuts on the screw.

It is still another object of this invention to provide a control means for operating the respective nut gripping units through which the nut gripping action is easily imparted and maintained during the proposed feed by a slight manual pressure on the lever and whereby the lever is automatically returned to a balanced neutral position upon release for instantly discontinuation of the carriage movement. The particular advantage of a manually maintained feed for this type of mechanism is that in the event of any obstruction occurring in the path of movement of the carriage or in any other case of obstruction, the manual force possible in any event is insufficient to maintain the feed and the carriage movement will be automatically stopped without damage to the parts.

Other objects and certain advantages will be more fully apparent from a description of the accompanying drawings, in which:

Figure 1 is a fragmentary side view of the lathe carriage shown partly in section for the purpose of illustrating the arrangement of the power traversing means relative to the carriage.

Figure 2 is a fragmentary top plan view illustrating the control leverage connection through the carriage to the respective nut clutching means.

Figure 5 is a sectional view taken on line 5—5, Figure 2 for further illustrating the gripping devices.

Figure 6 is a side view of the control lever balancing device shown partly in section for illustrating the plungers thereof.

Figure 7 is a sectional view taken on line 7—7, Figure 1 further detailing the control lever balancing device.

Figure 3:
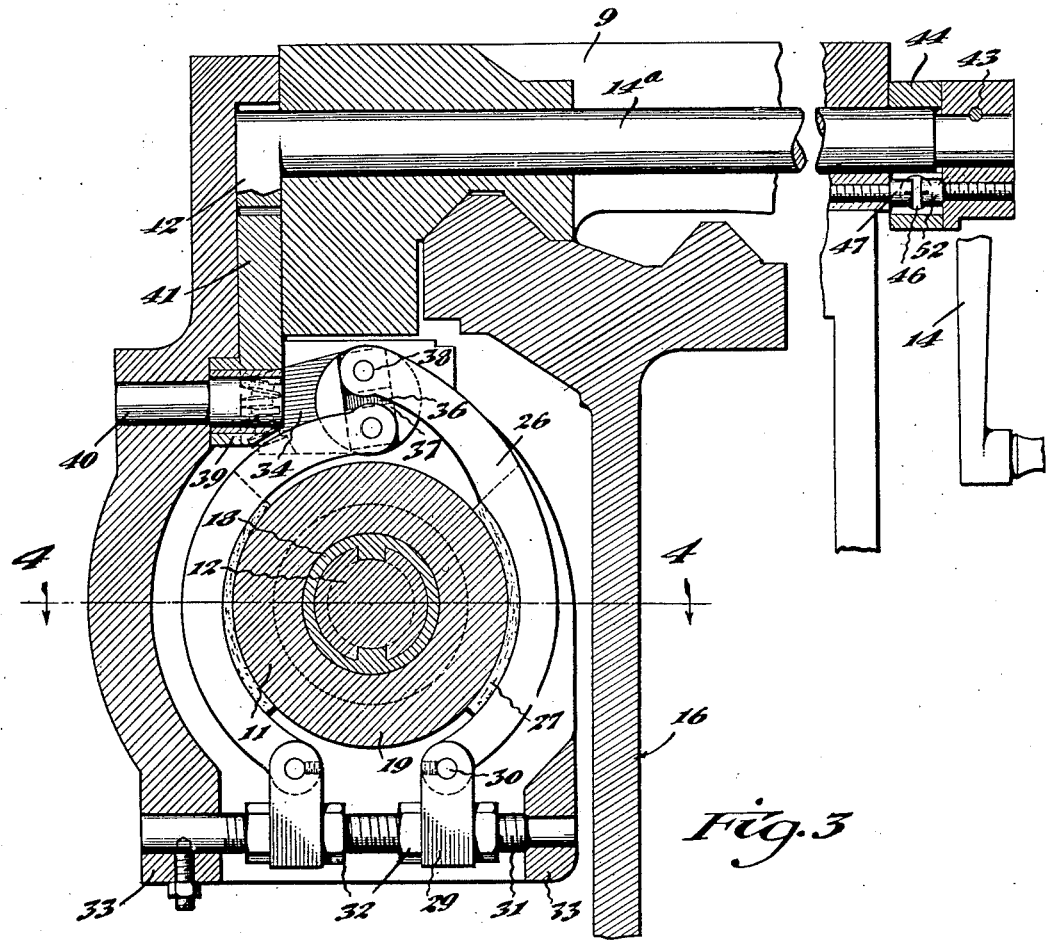
Figure 3 is an enlarged sectional view taken on line 3—3, Figure 1, showing a nut gripping or clutching unit in detail.
Figure 4:
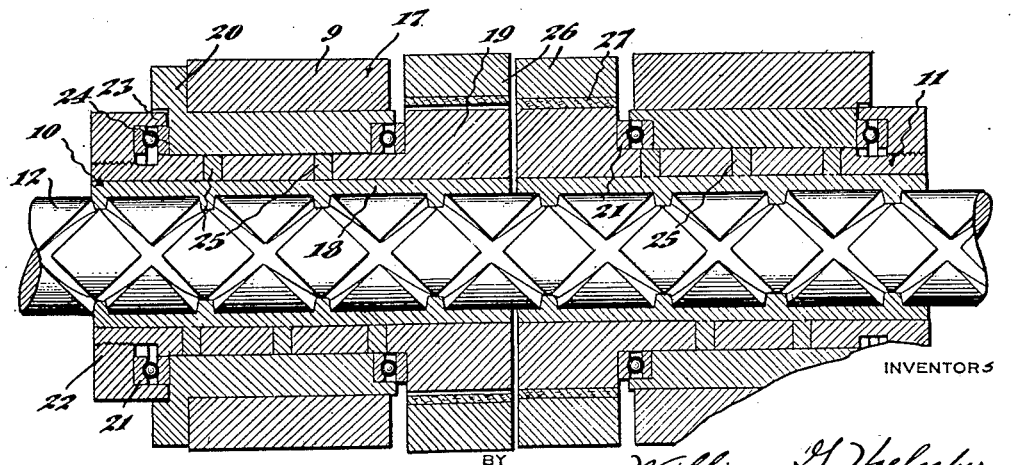
Figure 4 is a sectional view taken on line 4—4, Figure 3, disclosing the arrangement of the nuts relative to the feed screw.

Described in general, the present invention is incorporated within the carriage 9 of the lathe and is inclusive of a pair of nuts 10, 11 respectively, which nuts are adjacently disposed and engaged about a uni-directionally driven screw shaft 12 having double threads thereon extending in both directions, the nuts being right and left hand for cooperation with the respective threads. The nuts are loosely journalled for normal free rotation with the screw shaft and each has associated therewith a gripping means 13 for fixing the same to the carriage, the gripping means being alternately operated by means of a common lever 14 having a special transmission connection to the gripping means for the proper leverage.

The lever connection includes a cross rod 14ᵃ extending through the carriage and transversely of the ways of the lathe for disposing the manually operable control handle 13 at the most convenient side of the lathe. Directly associated with the handle is a balancing device 15 for effectively returning the lever to neutral or released position for both the gripping devices immediately upon a release of the handle. The power traverse is effected by continued manual pressure on the control lever to its respective sides for the respective directions of carriage feed.

Referring specifically to the drawings, the lathe bed generally indicated at 16 includes the conventional longitudinally disposed ways upon which is mounted the carriage 9. The carriage includes a depending portion 17 at one side disposed alongside of the lathe body and traversed by the screw shaft 12. The screw shaft is constantly driven in the same direction, the power means therefor being omitted from the drawings inasmuch as it may be entirely conventional. The feed screw at the point of the carriage through which it is disposed is surrounded by the nuts 10, 11, which are of sleeve character. Each nut is of substantially half the length represented by the length of carriage traversed by the feed screw with a slight clearance between the respective nuts.

Each nut includes a poured interior sleeve or bearing liner 18 directly in engagement with the screw shaft and an outer sleeve body, the sleeve body having a head 19, the heads of the respective nuts being adjacently disposed within the carriage. A bearing bracket 20 rotatively mounts each nut and includes suitable ball bearings for receiving the longitudinal or driving thrusts. These thrusts of each nut within the bearing bracket are taken care of by means of end thrust ball bearings 21. One of these bearings is disposed between the head of the nut and the bearing bracket and the other is disposed between the outer end of the nut and a collar 22 screw-threaded onto the end of the nut for adjustably clamping the nut upon the respective end thrust bearings.

The screw-threaded collar has an overhanging portion 23 surrounding the end thrust bearing and protecting the same against the entrance of dirt. The end face of the bearing bracket is recessed as at 24 to receive the nut and end thrust bearing for additionally protecting the bearing.

The liner or bearing portion of the nut is held in position by studs 25 which are cast therewith within radial bores of the nut sleeve body. The threads of the nuts are respectively right and left hand threads and engage the respective threads of the screw shaft. The carriage 9 is open about the region of the heads of the nuts and it is within this open portion that the nut gripping or clamping means 13, 13 are mounted.

Each gripping device consists of pivoted semi-circular bands 26, 26, each including a friction lining 27 on its inner circular surface adapted to engage the head of a particular nut. The pivoted ends of these levers are bifurcated and straddle the upwardly extending lug 28 of adjustable pivot elements 29, pivot pins 30 traversing the arms of the bifurcations and the lugs. The pivot elements are slidably mounted on a common rod 31 and are secured in position by means of nuts 32 screw-threaded on the rod, there being two nuts for each element for clamping the same therebetween at any desired position on the rod. The rod is fixed in position within lugs 33 of the carriage.

The adjacent upper ends of each set of levers or clamping arms are coincidentally actuated by a common means which is disposed between the respective sets, the sets being reversely actuated to cause gripping of one nut when the other is fully released.

For this purpose of coincidental actuation of the pairs or sets of clamping arms, segmental bevel gears 34 are mounted in the carriage. Each gear includes a stud 35 for rotatably mounting the same and has a diametric groove 36 in its inner face adjacent the actuated ends of the arms of a pair. Each actuated arm end carries a slide block 37 rotatively mounted therein by means of a stud 38, both of the blocks for the clamp arms of a set being located in the particular groove and, therefore, extending laterally from the actuated arm ends. The respective blocks of a set are located within the groove at diametrically opposite sides of the center of rotation of the gear segment and it will, therefore, be observed that rotation of the gear segment either tightens both arms upon the head of the particular nut or moves both out of engagement with the head.

These segmental bevel gears are in mesh at the respectively opposite sides of a mutilated gear 39 loosely rotatively journalled in the carriage by means of a stub shaft 40. Rotation of this mutilated gear in respective directions accomplishes reverse actions of the respective pairs of clamping arms; in other words, coincidentally tightening one set and loosening the other. In addition to the bevel gear portions, the mutilated gear includes a straight gear portion 41 which extends upwardly and has its teeth in mesh with the teeth of a segmental gear 42 formed on one end of the control rod 14ª mounted through the carriage transversely to the ways of the lathe bed.

The purpose of extending the control rod through the carriage is to provide the operating lever on the opposite side of the lathe for convenience of operation, the screw shaft being located in this case on the off side of the lathe and therefore inconveniently disposed for direct operation from that side. However, it will be apparent that the operating lever and its associated mechanism may be located on the same side of the lathe as the nut gripping devices if desired.

The control lever 14 is fixed to a counterturned end portion of the cross rod by means of a cross pin 43 and has mounted therein elements of the balancing mechanism which are component to other parts contained within a plate 44 attached to the side of the carriage about the cross rod by means of screws 45. Within this plate a pair of balancing plungers 46 are installed. These plungers are axially aligned for movement toward and from each other. They are normally urged inwardly and toward each other for abutment with a stud 47 fixed in the plate and extending into the center of a clearance opening 48 in the plate.

Each plunger is of hollow sleeve-like construction and has a closed head end. A spring 49 under compression is disposed within the bore of each plunger engaging the closed end of the bore. Screws 50 are disposed in the outer ends of the bores housing the plungers, these screws including counterturned portions 51 for centering the springs.

For the purpose of imparting a balancing action to the hand lever 14 which controls the application of the power traverse to the carriage, a stud or fillister head screw 52 is located within the hub of the handle and has its head disposed inwardly for movement within the clearance opening of the plate. The heads of the abutment stud 47 and the fillister head screw 51 extend substantially to the center line of the respective plungers with a very slight clearance therebetween in order that the stud 51 of the lever may swing clear of the abutment stud and whereby both studs are effective for engaging or being engaged by the respective plungers.

In the normal neutral position of the handle with both gripping devices disengaged from their respective nuts, the stud 51 of the handle is axially aligned with the abutment stud of the plate.

However, as occurs when the handle is manually moved to a particular side for effecting a clamping action on a particular nut (see Figure 6), the stud 51 of the handle engages that plunger 46 at the particular side to which it is moved compressing the spring thereof and moving the plunger within its bore. It is necessary to hold the lever in position manually for continued power traverse. The moment the lever is released, the spring actuated plunger 46 is effective for rotating the handle 14 back to neutral due to the pressure of the plunger on the stud 51 causing a directly rotative force to the control rod. The plunger will return the stud 51 to aligned position with the abutment stud 47 and the plunger 46 on the opposite side will prevent any movement past the aligned position.

The full action of the mechanism is as follows: Assuming that the operator wishes to traverse the carriage 9 in a particular direction, he moves the control lever 14 to the side which will effect the appropriate clamping as indicated by any appropriate marking on the machine. This is effective for depressing the particular plunger 46 and placing the hand lever under spring urged pressure tending to return it to neutral, this being prevented, however, as long as the operator continues to hold the lever in a set position.

The movement of the hand lever 14 rotates the control rod 14ª and this rotation is imparted to the mutilated beveled gear 39 through the meshing straight gears 41, 42, and the mutilated beveled gear 39 is effective for actuating both of the segmental gears 34, 34 directly connected to the clamping or gripping bands 26. One of the pairs of arms is moved inwardly by the rotation of its segmental gear actuating through the slot and slidable block connections and the other pair of arms is reversely actuated. After a certain period of time, the brake bands will wear down somewhat toward the actuated ends of the levers. This condition caused by uneven wear can be very quickly remedied by adjusting the pivoted ends of the respective arms, moving the same inwardly toward each other as to each pair.

The present mechanism is readily adapted to any type of carriage which is actuated for both directions of feed through a common screw shaft having threads running in both directions.

Having described our invention, we claim:

1. A carriage traversing mechanism, comprising, a feed screw having a right hand thread and a left hand thread and extending through the carriage, a right hand nut and a left hand nut, said nuts loosely rotatively mounted within the carriage and each engaged with a respective thread of the screw, a gripping device associated with each nut and operatively mounted within the carriage, a common actuating means for said gripping devices, said means adapted to simultaneously actuate one gripping edvice for fixing its respective nut to the carriage coincidentally with the release of the other, and a balancing device acting upon said common operating means for normally maintaining the same in neutral position with both devices released whereby it is necessary to exert continued manual pressure on the common operating means for maintaining the respective gripping devices in operative position against the action of the balancing device when carriage traversal is desired.

2. A carriage traversing mechanism, comprising, a right and left hand feed screw extending through the carriage, a right hand nut and a left hand nut loosely rotatively mounted within the carriage and each engaging its respective thread of the feed screw, a braking device associated with each nut, a common actuating lever for said braking devices, said lever adapted to actuate one braking device for fixing its respective nut to the carriage coincidentally with the release of the other, and spring-urged balancing plungers acting upon said common actuating lever for normally maintaining the same in neutral position with both braking devices released whereby it is necessary to manually maintain the particular braking devices in operative position.

3. In a mechanism for traversing the carriage of a lathe, a feed screw traversing said carriage and including right and left hand threads, right and left hand nuts independently rotatably mounted within the carriage, a pair of brake bands for each nut pivoted to the carriage and encircling portions of the respective nuts, a rotatable element disposed adjacent the swinging end of each pair of brake bands, said rotatable elements including slots in their end faces, slide blocks rotatably mounted in the ends of the respective brake bands, said slide blocks disposed within the adjacent slot of the particular rotatable element and means for rotating said rotatable elements in reverse directions whereby the pairs of brake bands are alternately engaged upon the nuts for fixing the same to the carriage for reverse directions of traversal of the carriage.

4. In a device of the class described, a lathe body including ways, a carriage slidably mounted on said ways, a right and left hand screw traversing said carriage, a right hand nut and a left hand nut mounted within the carriage and about said screw, devices for alternately gripping said nuts to produce reverse traversal of said carriage, and an automatically neutrally balanced lever device for alternately actuating said devices.

5. In a power traverse mechanism for the carriage of a lathe, a feed screw including right and left hand threads extending through said carriage, a right hand nut and a left hand nut on the feed screw, said nuts independently rotatably mounted within the carriage, brake bands pivoted to the carriage and encircling portions of the respective nuts, a rotatable element disposed adjacent the swinging ends of each pair of brake bands, said rotatable elements having offset rotative connections to the respective swinging ends of the brake bands, and means for alternately rotating said rotatable elements whereby the pairs of brake bands may be alternately engaged upon the nuts for fixing the particular nut to the carriage for reverse directions of traversal thereof.

6. In a power traversing mechanism for moving the carriage of a lathe, a feed screw including a right hand thread and a left hand thread, a pair of nuts independently rotatively mounted in the carriage, said nuts including right and left hand threads respectively engaging the respective threads of the feed screw, a device for gripping each nut, control means for actuating said devices for coincidentally gripping one nut and releasing the other, a lever for operating said control means, an abutment on the carriage, a swinging stud carried by the lever, said abutment and stud adapted to be disposed in alignment when the lever is in neutral position, and spring operated plungers engaging the respectively opposite sides of the abutment and the stud, said plungers disposed for sliding movement tangentially of the circular path of swing defined by the center of the stud whereby the plungers are effective for engagement with the stud for maintaining the same in alignment with the abutment unless pressure is exerted on the lever for the appropriate direction of carriage traversal.

7. In a power traverse mechanism for moving the carriage of a lathe, a feed screw including right and left hand threads, a pair of nuts rotatively mounted in the carriage and on said feed screw, said nuts having right and left hand threads respectively, a device for gripping each nut, control means for simultaneously gripping one nut and releasing the other, a lever for operating said control means, spring operated plungers engaging the respective opposite sides of the lever for rotatively urging the same in opposite directions, and means for limiting the action of the plungers at a common point whereby the plungers are effective for returning the lever to neutral unless manual pressure is exerted on the lever for the appropriate direction of carriage traversal.

WILLIAM G. HOELSCHER.
GEORGE E. HIEBER.